(12) United States Patent
Gao

(10) Patent No.: US 8,797,493 B2
(45) Date of Patent: Aug. 5, 2014

(54) THIN FILM TRANSISTOR LIQUID CRYSTAL DISPLAY PANEL

(75) Inventor: Wenbao Gao, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 632 days.

(21) Appl. No.: 12/124,634

(22) Filed: May 21, 2008

(65) Prior Publication Data

US 2009/0033843 A1      Feb. 5, 2009

(30) Foreign Application Priority Data

Jul. 31, 2007   (CN) .......................... 2007 1 0119782

(51) Int. Cl.
  *G02F 1/1339*    (2006.01)
  *G02F 1/1333*    (2006.01)
(52) U.S. Cl.
  USPC .......................................... 349/153; 349/110
(58) Field of Classification Search
  USPC .................. 349/110, 106–109, 153–154, 190
  See application file for complete search history.

(56) References Cited

U.S. PATENT DOCUMENTS

| | | | |
|---|---|---|---|
| 5,790,220 A * | 8/1998 | Sakamoto et al. | 349/110 |
| 7,339,647 B2 * | 3/2008 | Youn et al. | 349/153 |
| 7,564,533 B2 * | 7/2009 | Jang et al. | 349/153 |
| 2007/0153167 A1 | 7/2007 | Jang et al. | |
| 2007/0291216 A1 * | 12/2007 | Chan et al. | 349/153 |

* cited by examiner

*Primary Examiner* — Dung Nguyen
(74) *Attorney, Agent, or Firm* — Ladas & Parry LLP

(57) ABSTRACT

A thin film transistor liquid crystal display (TFT LCD) panel, comprising an array substrate and a color filter substrate which are bonded together with a sealant, wherein a black matrix and a common electrode are formed on the color filter substrate, a data-line wiring is connected with a patterned pad for data-line signal output after being led out from an display region of the array substrate, a gate-line wiring is connected with patterned pad for gate-line signal output after being led out from the display region of the array substrate, and an opening structure is formed in the black matrix in a region where the color filter substrate overlaps with the data-line wiring.

3 Claims, 5 Drawing Sheets

THIN FILM TRANSISTOR LIQUID CRYSTAL DISPLAY PANEL

BACKGROUND

The present invention relates to a thin film transistor liquid crystal display (TFT LCD), and particularly, to a TFT LCD panel.

In producing of a TFT LCD, electrostatic is always induced for example during production, testing, and transporting. Friction and contact may generate an instantaneous voltage up to thousands of voltages and generate a large current of about 20 amperes. However, a glass substrate for the TFT LCD is non-conductive and is not favorable for release of the electrostatic. Electrostatic accumulation (ESC) and electrostatic discharging (ESD) are prone to breakdown insulating layers on the substrate and directly result in a short circuit or partial damage, thus reducing yield.

In addition, to improve the production efficiency during producing of a TFT LCD, Au balls (in general, formed of plastic particles coated with a Ni or Au layer) are used in design for many products, and the Au balls can replace the conventional conductive Ag adhesive. Au balls communicate the common electrode for a color filter substrate and the common electrode for an array substrate, thus decreasing process steps and improving the production efficiency. However, the common electrode (usually made of indium tin oxide (ITO)) on the color filter substrate tends to induce electrostatic breakdown with a data-line wiring or a gate-line wiring via the Au balls and form a data-line or gate-line bright line (also called an X or Y bright line in the art), certain reason for which lies in that the external electrostatic induced during production breaks down the protection layer on the data-line wiring or the gate-line wiring so that the data-line wiring or the gate-line wiring and the common electrode on the color filter substrate are conducted via the Au balls.

In the conventional design, Au balls are directly mixed in the sealant for coating. Au balls are particles dispersed in the sealant and are pressed during the assembly process between the array substrate and the color filter substrate, in which Au balls contacts the common electrode of the color filter substrate and the common electrode of the array substrate to establish a conduction path therebetween. Such process is similar to Ag adhesive electrode in the conventional assembly process. In this process, Au balls will directly contact the protection layer in a data-line wiring region or a gate-line wiring region, and the electrostatic during the process may easily breaks down the protection layer. The breakdown mentioned above occurs in the conventional process at a probability of about 1% and reduces the yield.

FIG. 1 is a structure diagram showing a conventional TFT LCD. As shown in FIG. 1, the TFT LCD comprises an array substrate and a color filter substrate, which are bonded together with a sealant (mixed with Au balls therein) 4 to form a panel. Between the edge of the array substrate 1 and the edge of the color filter substrate 3, there are provided a plurality of patterned pads 2 for data-line signal output and connected with data-line wirings. Also, there are provided a plurality of patterned pads for gate-line signal output and connected with gate-line wirings on the array substrate, which are not shown in FIG. 1. After being led out from a display region 8 of the array substrate, the data-line wirings 6 are connected with the patterned pads 2 for data-line signal output. Data-line signals pass over the patterned pads 2 for data-line signal output and the data-line wirings 6 of the TFT LCD panel via the peripheral circuit and enter the display region for image displaying.

FIG. 2 is an enlarged view of the portion indicated by a reference numeral 7 in FIG. 1, and FIG. 3 is a cross-sectional view taken along line A-A in FIG. 2.

With reference to FIGS. 2 and 3, portions of the data-line wirings 6 on the array substrate 15 and those of the common electrode 13 on the color filter substrate 11 overlap each other and contact via Au balls 14 in sealant 4. In this situation, only a protection layer 12 over the data-line wirings 6 acts as an isolation layer (FIG. 2). After the assembly process, the sealant 4 with Au balls 14 is pressed to conduct the common electrodes on the upper and lower substrates. When the sealant 4 with Au balls 14 are pressed, the Au balls 14 and the protection layer 12 fully contact with each other; however, the thickness of the protection layer 12 formed over the data-line wirings 6 is only about 0.3 µm. Therefore, under a strong electric field between the applied data-line signals and the common electrode signals, the protection layer 12 is prone to be broken down. Once the protection layer 12 is broken down, a short circuit forms between the common electrode on the color filter substrate and the data-line wirings in the overlapping portions, which induces poor display quality. The electrostatic breakdown portion is illustratively indicated with the reference number 10 in FIGS. 2 and 3, where the electrostatic breakdown occurs. In a same way, short circuit between the common electrode on the color filter substrate and the gate-line wirings in the overlapping portions may occur and lead to poor display quality, which is not described herein for simplicity.

In addition, in the conventional technique, a black matrix of the color filter substrate forms an integral structure outside the display region, and the common electrode is formed with a blanket deposition process. Therefore, the black matrix needs one mask process during formation, and the common electrode needs no mask process in formation. That is to say, in the portion where the common electrode on the color filter substrate and a data-line wiring or a gate-line wiring overlap each other, it is inevitable for the common electrode on the color filter substrate to directly contact the protection layer on the data-line wirings or the gate-line wirings by using Au-balls.

SUMMARY

According to an embodiment of the present invention, there is provided a TFT LCD panel, comprising an array substrate and a color filter substrate, which are bonded together with a sealant, wherein a black matrix and a common electrode are formed on the color filter substrate, a data-line wiring is connected with a patterned pad for data-line signal output after being led out from an display region of the array substrate, a gate-line wiring is connected with patterned pad for gate-line signal output after being led out from the display region of the array substrate, and an opening structure is formed in the black matrix in a region where the color filter substrate overlaps with the data-line wiring.

According to an embodiment of the present invention, there is provided a TFT LCD panel, comprising an array substrate and a color filter substrate which are bonded together with a sealant, wherein a black matrix and a common electrode are formed on the color filter substrate, a data-line wiring is connected with patterned pads for data-line signal output after being led out from an display region of the array substrate, a gate-line wiring is connected with a patterned pad for gate-line signal output after being led out from the display region of the array substrate, and an opening structure is formed in the black matrix in a region where the color filter substrate overlaps with the gate-line wiring.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Exemplary embodiments of the present invention will be described hereinafter with reference to the accompanying drawings. It should be understood that in this description when a layer or a element is referred to as being "on" or "connected to" another layer or element, this layer or element can be directly on or directly connected to the other layer or element, or an intervening layer may also be present.

The First Embodiment

Figure 1:
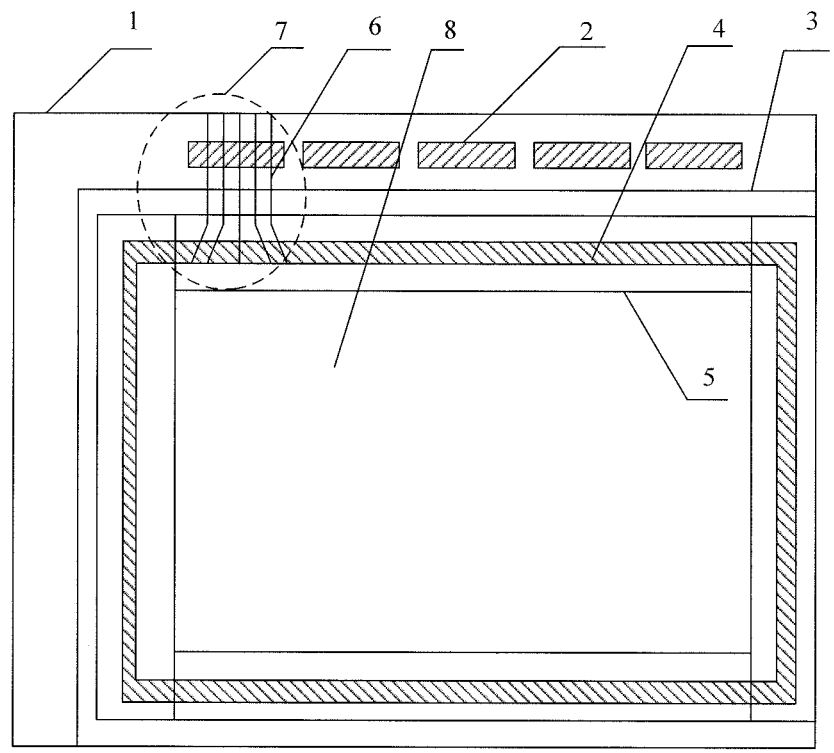
FIG. 1 is a structure diagram showing a conventional TFT LCD.
Figure 2:
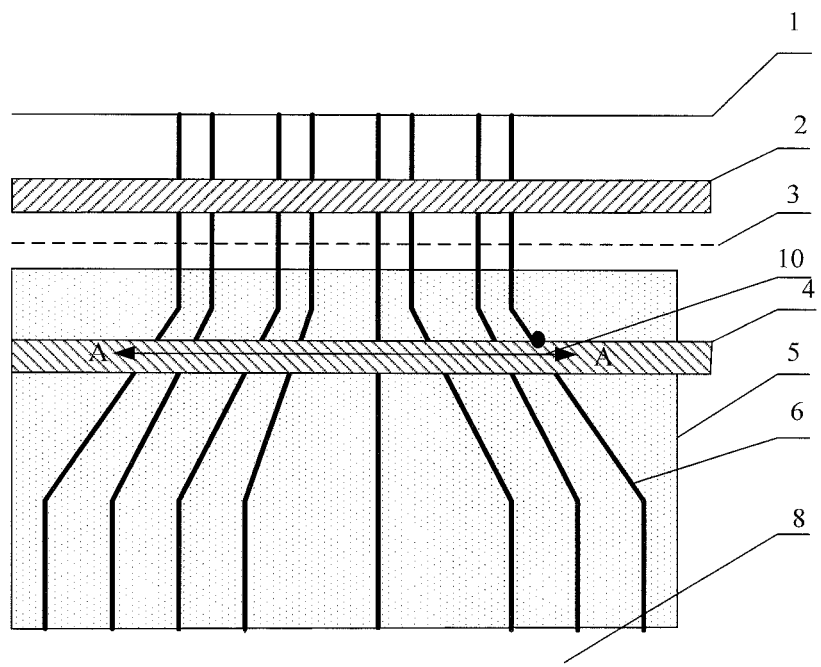
FIG. 2 is an enlarged view of the portion indicated by a reference numeral 7 in FIG. 1.
Figure 3:
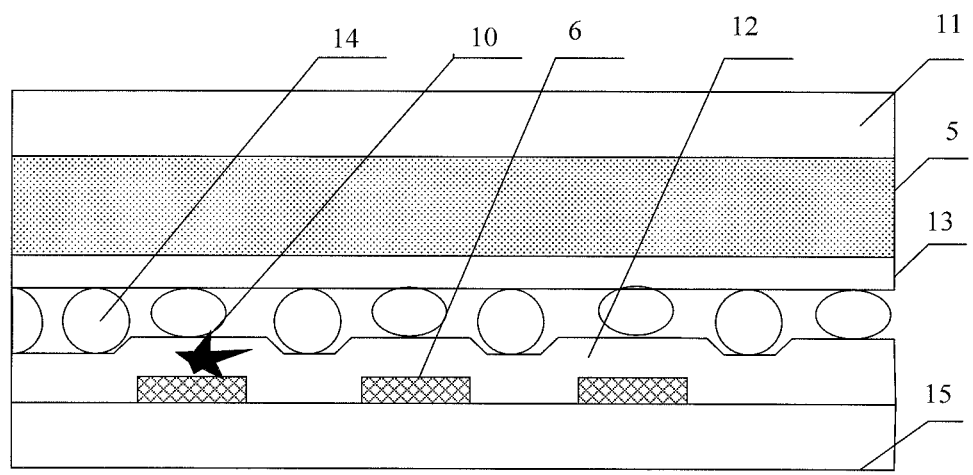
FIG. 3 is a cross-sectional view taken along line A-A in FIG. 2.

A TFT LCD panel according to a first embodiment of the invention also has a similar general configuration as illustrated in FIG. 1, in which data-line wirings and related portions are shown, but gate-line wirings and related portions are not shown.

As shown in FIG. 1, the TFT LCD panel comprises an array substrate and a color filter substrate, which are bonded together with a sealant (mixed with Au-balls) 4 to form a panel. Between the edge of the array substrate 1 and the edge of the color filter substrate 3, there are provided a plurality of patterned pads 2 for data-line signal output. After being led out from the display region 8 of the array substrate, the data-line wirings 6 are connected with the patterned pads 2 for data-line signal output. Data-line signals pass over the patterned pads 2 for data-line signal output and the data-line wirings 6 of the TFT LCD panel via the peripheral circuit and enter the display region so that the display signals can be input. In this embodiment, the structure of a black matrix in the region where the common electrode on the color filter substrate and the data-line wiring on the array substrate overlap each other is different from that of the conventional design.

Figure 4:
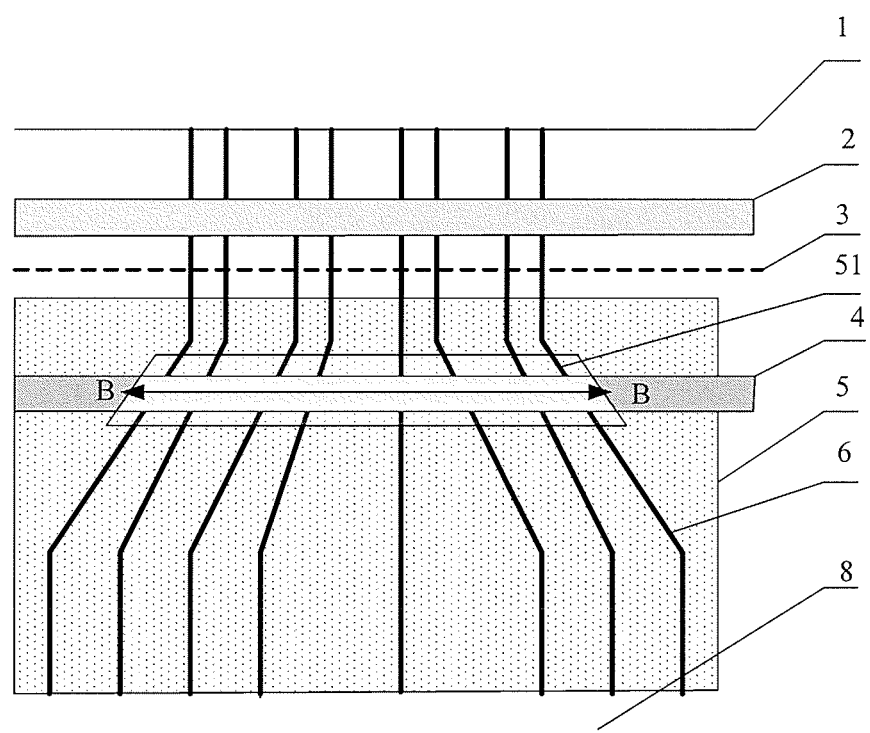
FIG. 4 is an enlarged view showing the data-line wiring region in the TFT LCD panel according to a first embodiment of the present invention.
Figure 5:
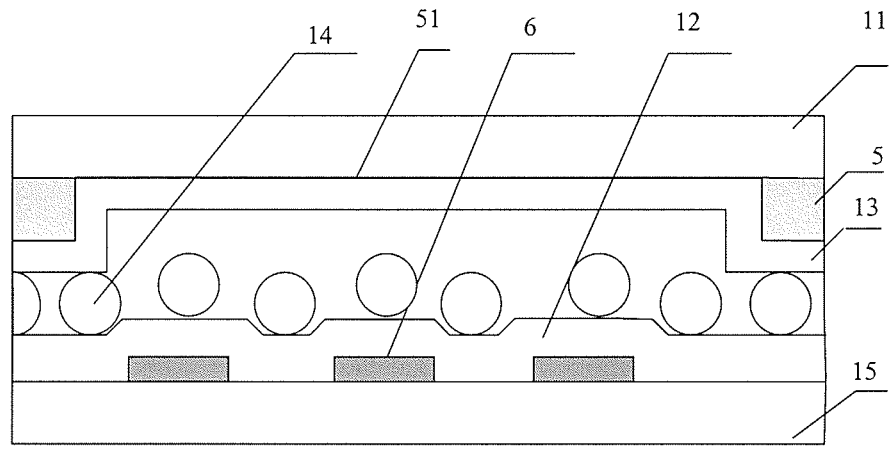
FIG. 5 is a cross-sectional view taken along line B-B in FIG. 4.

FIG. 4 is an enlarged view showing the data-line wiring region in the TFT LCD panel according to the present embodiment. As shown in FIG. 4, a black matrix 5 in the region where the common electrode on the color filter substrate and the data-line wirings on the array substrate overlap each other has an opening structure 51. FIG. 5 is a cross-sectional view taken along line B-B in FIG. 4. With reference to FIGS. 4 and 5, since the black matrix 5 above the color filter substrate 11 has an opening structure 51, after the array substrate 15 is bonded with the color filter substrate 11, no black matrix layer is present in the region where the common electrode 13 on the color filter substrate 11 and the data-line wirings 6 on the array substrate 15 overlap each other, and space is increased in this region between the substrates.

After the assembly process, although the sealant with Au-balls 14 is also pressed, Au-balls 14 only establish conduction at the portion where both the upper substrate and the lower substrate are provided with the common electrode. However, in the region where the common electrode 13 on the color filter substrate 11 and the data-line wirings 6 on the array substrate 15 overlap each other, the opening structure 51 is formed for the black matrix 5, so that the Au-balls 14 can be received in this space. Therefore, there will be no strong contact between the Au-balls 14 and the protection layer 12 on the data-line wirings 6, and the possibility of electrostatic breakdown in this region can be substantively reduced or eliminated.

The Second Embodiment

Figure 6:
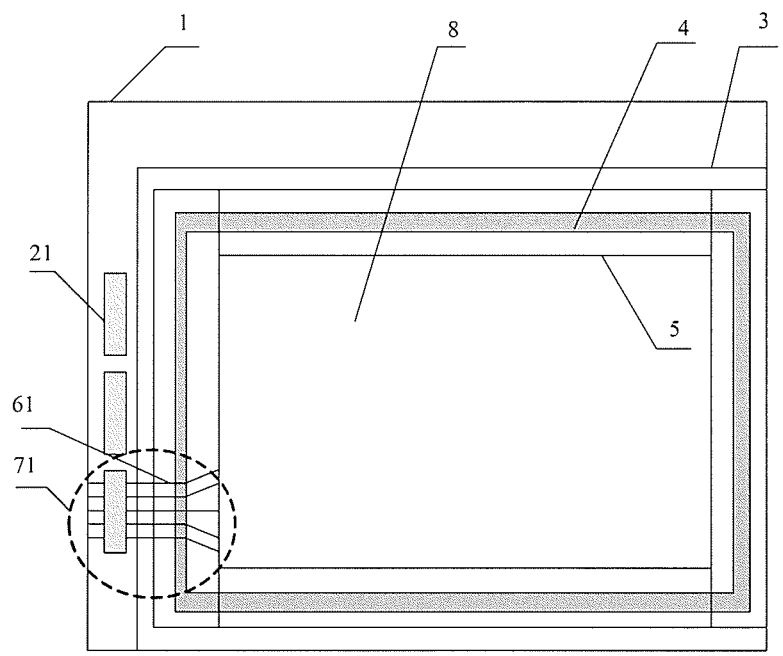
FIG. 6 is a structure diagram showing the TFT LCD panel according to a second embodiment of the present invention.

A TFT LCD panel according to a second embodiment is illustrated in FIG. 6, in which gate-line wirings and related portions are shown, but the data-line wirings and related portions are not shown. In this embodiment, the TFT LCD panel comprises an array substrate and a color filter substrate, which are bonded together with a sealant (mixed with Au-balls therein) 4 to form a panel. Between the edge of the array substrate 1 and the edge of the color filter substrate 3, there are provided a plurality of patterned pads 21 for gate-line signal output. After being led out from the display region 8 of the array substrate, the gate-line wirings 61 are connected with the patterned pads 21 for gate-line signal output. Driving signals pass through the patterned pads 21 for gate-line signal output and the gate-line wirings 61 of the TFT LCD panel via the peripheral circuit and enter the display region, so that the display signals can be input. In this embodiment, the structure for the black matrix in the region where the common electrode on the color filter substrate and the data-line wiring on the array substrate overlap each other is different from the conventional design.

Figure 7:
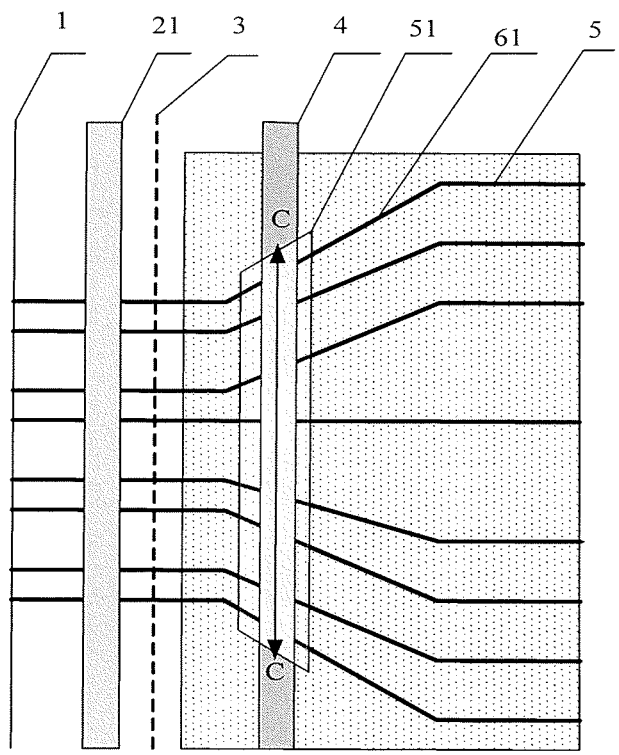
FIG. 7 is an enlarged view showing the gate-line wiring region in the TFT LCD panel according to the second embodiment.
Figure 8:
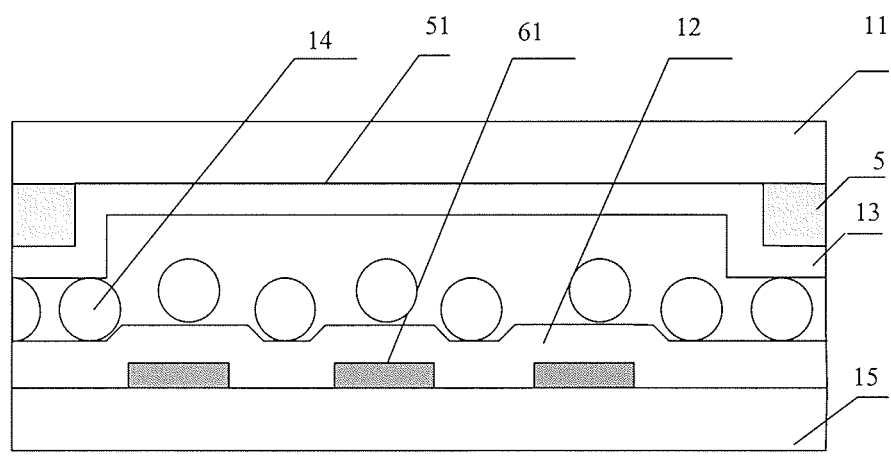
FIG. 8 is a cross-sectional view taken along line C-C in FIG. 7.

FIG. 7 is an enlarged view showing the gate-line wiring region indicated with the reference number 71 in the TFT LCD panel according to the present embodiment. As shown in FIG. 7, a black matrix 5 in the region where the common electrode on the color filter substrate and the gate-line wiring on the array substrate overlap each other has an opening structure 51. FIG. 8 is a cross-sectional view taken along line C-C in FIG. 7. With reference to FIGS. 7 and 8, since the black matrix 5 above the color filter substrate 11 has an opening structure 51, after the array substrate 15 is bonded with the color filter substrate 11 to form a panel, no black matrix layer is present in the region where the common electrode 13 on the color filter substrate 11 and the gate-line wirings 61 on the array substrate 15 overlap each other, and space is increased in this region between the substrates. After the assembly process, although the sealant with Au-balls 14 is pressed, the Au-balls 14 only establish conduction at the place where both the upper substrate and the lower substrate are provided with the common electrodes. However, in the region where the common electrode 13 on the color filter substrate 11 and the gate-line wirings 61 on the array substrate 15 overlap each other, the opening structure 51 is applied to the black matrix, so that the Au-balls can be received in this space. Therefore, there will be no strong contact between the Au-balls 14 and the protection layer 12 on the gate-line wirings 61, and the possibility of electrostatic breakdown in this region can be substantively reduced or eliminated.

The Third Embodiment

In this embodiment, opening structures are applied for the black matrix in both the regions where the color filter substrate overlaps with the data-line wirings and gate-line wirings on the array substrate. The detailed structure is the same as those described in the above first and second embodiments. In this manner, the possibility of electrostatic breakdown in the data-line wirings and the gate-line wirings can be substantively reduced or eliminated, and the production yield can be further improved.

Compared with the conventional design, since the black matrix in both the regions where the color filter substrate overlaps with the data-line wirings and the gate-line wirings on the array substrate has opening structures, and space is increased in these regions between the substrates. After assembly process, Au-balls in the sealant can be received in the space. Therefore, there will be no strong contact between the Au-balls and the protection layer on the gate-line wirings and the gate-line wirings, the possibility of electrostatic breakdown in this region can be substantively reduced or eliminated, and the production yield can be further improved.

It should be appreciated that the embodiments described above are intended to illustrate but not limit the present invention. Although the present invention has been described in detail herein with reference to the preferred embodiments, it should be understood by those skilled in the art that the present invention can be realized with different material and equipment as necessary, and that various modification and equivalents thereof can be made herein without departing from the spirit and scope of the present invention.

What is claimed is:

1. A thin film transistor liquid crystal display (TFT LCD) panel, comprising an array substrate and a color filter substrate, which are bonded together with a sealant,
   wherein a black matrix is formed on the color filter substrate, a common electrode is formed on the black matrix and the color filter substrate, a plurality of data-line wirings are connected with a patterned pad for data-line signal output after being led out from an display region of the array substrate, and a plurality of gate-line wirings are connected with a patterned pad for gate-line signal output after being led out from the display region of the array substrate, and
   wherein a region where the color filter substrate overlaps with the data-line wirings is formed as an opening structure, and no black matrix is present anywhere in the region where the color filter substrate overlaps with the data-line wirings, and the common electrode is in a concave configuration in the opening structure;
   wherein Au-balls are mixed in the sealant, and the sealant is provided both within and outside of the opening structure and overlaps with the black matrix outside of the opening structure, and the Au-balls of the sealant within the opening structure do not contact the common electrode on the color filter substrate.

2. The TFT LCD panel according to claim 1, wherein a region where the color filter substrate overlaps with the gate-line wirings is formed as another opening structure, and no black matrix is present anywhere in the region where the color filter substrate overlaps with the gate-line wirings, and the common electrode is in a concave configuration in the another opening structure.

3. A thin film transistor liquid crystal display (TFT LCD) panel, comprising an array substrate and a color filter substrate, which are bonded together with a sealant,
   wherein a black matrix is formed on the color filter substrate, a common electrode is formed on the black matrix and the color filter substrate, a plurality of data-line wirings are connected with a patterned pad for data-line signal output after being led out from an display region of the array substrate, and a plurality of gate-line wirings are connected with a patterned pad for gate-line signal output after being led out from the display region of the array substrate, and
   wherein a region where the color filter substrate overlaps with the gate-line wirings is formed as an opening structure, and no black matrix is present anywhere in the region where the color filter substrate overlaps with the gate-line wirings, and the common electrode is in a concave configuration in the opening structure;
   wherein Au-balls are mixed in the sealant, and the sealant is provided both within and outside of the opening structure and overlaps with the black matrix outside of the opening structure, and the Au-balls of the sealant within the opening structure do not contact the common electrode on the color filter substrate.

* * * * *